United States Patent [19]

Miles

[11] 4,213,640
[45] Jul. 22, 1980

[54] COUPLING FOR INTERCONNECTING CONDUITS

[76] Inventor: Alfred Miles, 4070 Westcliff Dr., Hood River, Oreg. 97031

[21] Appl. No.: 902,985

[22] Filed: May 4, 1978

[51] Int. Cl.² .............................................. F16L 39/00
[52] U.S. Cl. ................ 285/137 R; 285/188; 285/197; 285/DIG. 16; 403/391; 285/177
[58] Field of Search ............... 285/188, 197, DIG. 16, 285/137 R, 157; 403/391, 400, 394, 398, 399, 389; 137/271; 248/232, 233, 68 R (U.S. only); 165/143, 144

[56] References Cited

U.S. PATENT DOCUMENTS

| 1,963,981 | 6/1934 | Garrett | 403/400 X |
|---|---|---|---|
| 2,229,344 | 1/1941 | Schneider | 165/143 X |
| 2,338,090 | 1/1944 | Bradfield | 285/188 |
| 3,107,932 | 10/1963 | Johnson et al. | 285/188 X |
| 3,354,517 | 11/1967 | Levinsky | 403/391 X |
| 3,360,883 | 1/1968 | Glanzer | 403/391 X |
| 3,649,055 | 3/1972 | Nilsen | 285/197 |
| 3,822,903 | 7/1974 | McNeely et al. | 285/137 R |
| 3,937,245 | 2/1976 | Christie | 285/197 X |

FOREIGN PATENT DOCUMENTS

| 1143062 | 1/1963 | Fed. Rep. of Germany | 403/400 |
|---|---|---|---|
| 1219289 | 6/1966 | Fed. Rep. of Germany | 403/391 |
| 1231101 | 4/1960 | France | 403/400 |
| 1297640 | 5/1962 | France | 165/143 |
| 865472 | 4/1961 | United Kingdom | 285/188 |

Primary Examiner—Thomas F. Callaghan
Attorney, Agent, or Firm—Kolisch, Hartwell & Dickinson

[57] ABSTRACT

An assembly of interconnected conduits including first and second conduits each having an aperture extending through its wall surface. The conduits are disposed adjacent to one another and a coupling interconnects them by presenting a fluid flow passage between the apertures.

7 Claims, 10 Drawing Figures

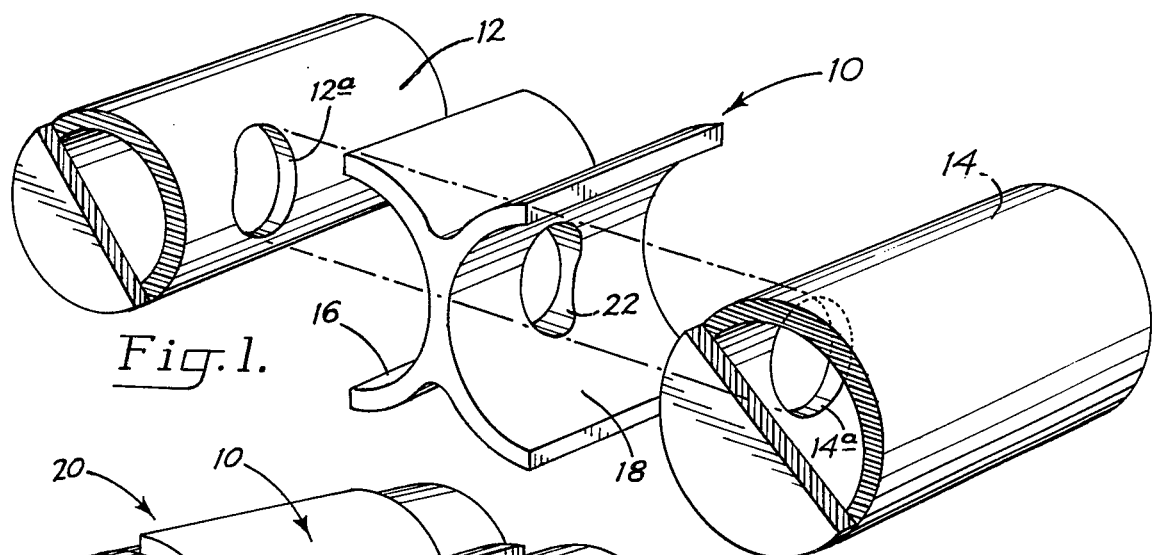
Fig. 1.
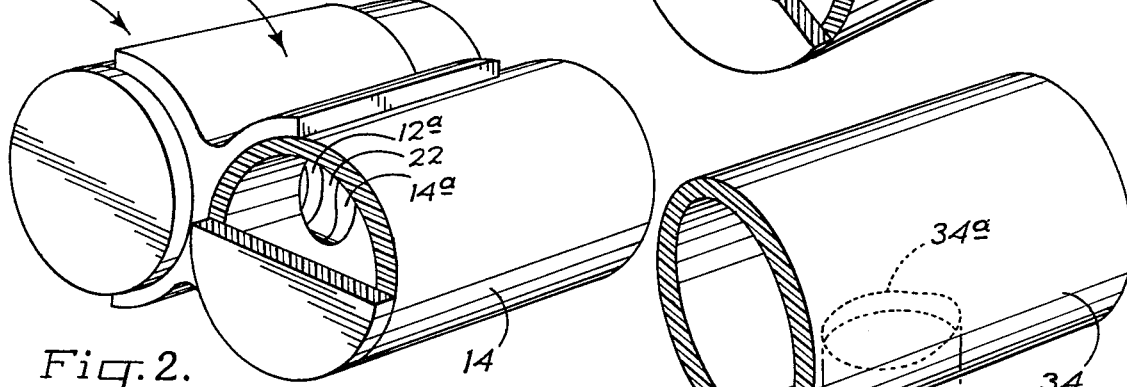
Fig. 2.
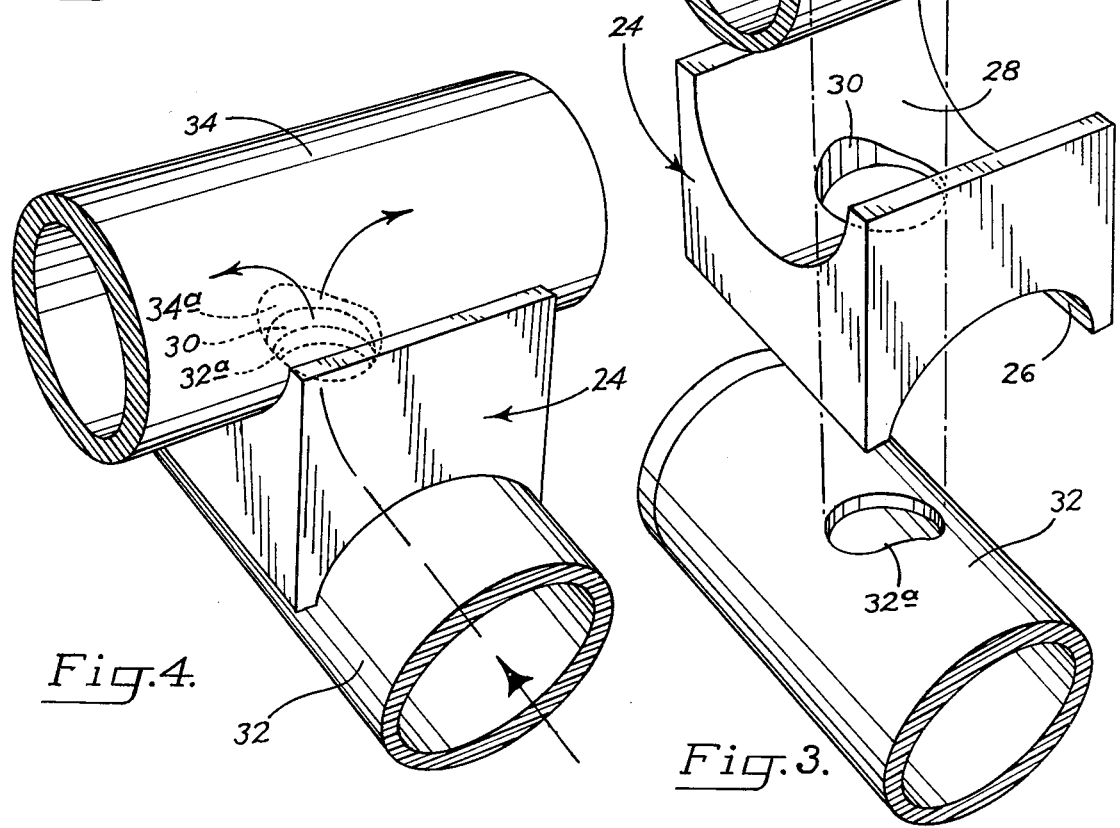
Fig. 4.
Fig. 3.

COUPLING FOR INTERCONNECTING CONDUITS

BACKGROUND AND SUMMARY OF THE INVENTION

The present invention relates to fittings or couplings for interconnecting conduits such as pipes or tubes, and more particularly to a novel coupling of unitary construction which permits close packing of tubes in an assembly.

In various types of heat exchangers, it is necessary that a given length of conduit be provided in order to meet certain design criteria. In order to conserve space, it is known to design heat exchangers so that the conduit is formed as a continuous sinuous or serpentine tube. While this construction permits a given length of conduit to be compressed into a smaller area, it is readily apparent that those portions of the conduit which are bent to form the serpentine configuration limit the extent to which the adjacent portions of the conduit can be placed side by side. Stated differently, a smooth bend must be provided which necessarily dictates that adjacent passes of the conduit cannot be closely packed.

In other forms of heat exchangers, such as evaporators and condensers, a construction known as shell-and-tube is employed wherein a shell is provided with a bundle of tubes extending throughout its length. Headers are mounted on each end of the shell and provide regions of fluid interchange between the tubes. While the tubes may be more closely positioned than with the aforementioned serpentine construction, it is apparent that the headers may involve rather large constructions which must be specially fabricated.

In solar collecting devices, it is desirable to position an array of conduits or tubes as close together as possible in order to conserve space as well as to provide more effective heat transfer. Known solar collecting apparatus utilizing solar collecting tubes are generally constructed with either serpentine tubes or a shell-and-tube construction.

Accordingly, it is a general object of the present invention to provide an assembly of interconnected conduits in which close packing or spacing of a conduit bundle is achieved by use of a novel coupling for interconnecting conduit pairs.

More particularly, the assembly of the present invention contemplates that a pair of interconnected conduits are each provided with an aperture extending through the wall thickness of the conduit. The coupling includes a passage and interconnects the apertures for permitting fluid flow between the conduits. Similarly, a bundle of conduits may be interconnected so that fluid flow may pass from successive conduits.

Another object of the present invention is to provide a coupling having opposed wall surfaces which are contoured for snugly receiving a conduit. For instance, each of the wall surfaces may be formed as a portion of a right cylinder having a diameter approximately equal to the diameter of a cylindrical conduit. Thus, the conduits may be adhered to an associated wall surface of the coupling with the apertures in the conduits aligned with the passage through the coupling.

Another object of the present invention is to provide a coupling which will replace the conventional T-fitting. More specifically, in another embodiment of the present invention it is contemplated that the coupling be provided with opposed wall surfaces, each having a contour defining a portion of a right cylinder, in which the longitudinal axes of the cylinders are positioned at right angles to one another. Thus, when conduits provided with apertures, as described above, are positioned adjacent the passage in the coupling, a T-fitting is provided.

These and additional objects and advantages of the present invention will be more readily understood from a consideration of the drawings and the following detailed description of the preferred embodiment.

BRIEF DESCRIPTION OF THE DRAWINGS

FIG. 1 is an exploded view, taken in perspective, of a coupling and a pair of conduits prior to their being assembled in accordance with the principles of the present invention.

FIG. 2 is a view similar to FIG. 1 illustrating the coupling and the pair of conduits after assembly;

FIG. 3 is an exploded view, taken in perspective, of another embodiment of the coupling of the present invention which provides a T-fitting;

FIG. 4 is a view similar to FIG. 3 illustrating assembly of the coupling and a pair of conduits for providing a T-fitting;

DETAILED DESCRIPTION OF THE PREFERRED EMBODIMENTS

Figures 5, 6, 7:
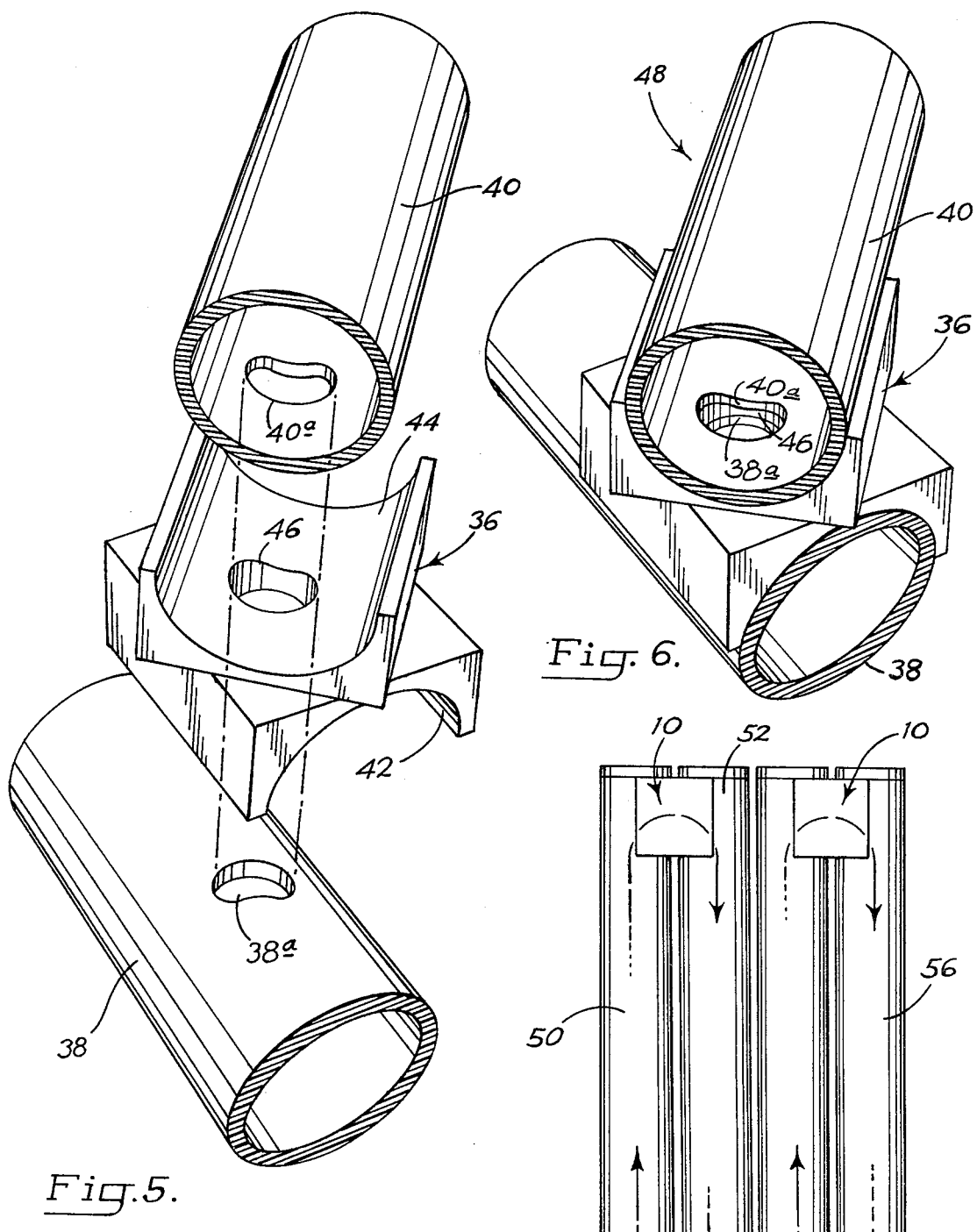
FIG. 5 is an exploded view, taken in perspective, of another embodiment of the coupling of the present invention.
FIG. 6 is an assembled view of the coupling and a pair of conduits shown in FIG. 5.
FIG. 7 is a top plan view of a conduit bundle wherein the conduits are interconnected by a plurality of couplings in accordance with the present invention.

Turning now to the drawings, and referring initially to FIG. 1, a coupling means such as a fitting or coupling is indicated generally at 10 for interconnecting a first conduit such as tube 12 to a second conduit such as tube 14. Coupling 10 is formed as a unitary member having a pair of opposed wall surfaces 16, 18. As can be seen, each of the wall surfaces is contoured for receiving, in a snug fit, at least a portion of one of the tubes. An assembly of coupling 10 and tubes 12, 14 is generally indicated at 20 in FIG. 2. Also, each of tubes 12, 14 is provided with an aperture (12a, 14a respectively) extending through its wall thickness. Only portions of the tube lengths are shown and caps are provided at the nearest ends as illustrated.

As can be best appreciated from a consideration of FIG. 1, each wall surface 16, 18 is contoured to define a cylindrical portion for receiving a cylindrical tube. For instance, wall surface 16 is contoured with an outer peripheral surface having generally the same radius as does tube 12. Similarly, wall surface 18 is provided with a contour having generally the same radius as the outer radius of tube 14. Further, it is to be noted that each of wall surfaces 16, 18 includes an opening communicating with the opening on the opposed wall surface by means of a substantially unobstructed passage such as bore 22. Thus, when tubes 12, 14 are assembled (as shown in FIG. 2) apertures 12a, 14a may be aligned with bore 22. Connection of tubes 12, 14 to wall surfaces 16, 18, respectively, is accomplished by providing an adhesive on the wall surfaces for bonding an associated tube. The result is a sealed connection which will permit fluid flow from one tube to the other.

It is to be noted that assembly 20 illustrated in FIG. 2 provides an arrangement in which the cylindrical axes of the wall surfaces as well as the cylindrical axes of tubes 12, 14 are generally parallel. The cylindrical axis of bore 22 is positioned so that it lies on a line generally perpendicular to the cylindrical axes of tubes 12, 14 as well as the cylindrical axes of wall surfaces 16, 18.

Turning now to FIGS. 3 and 4, another embodiment of a coupling according to the present invention is generally indicated at 24. As can be seen from a consideration of FIG. 3, coupling 24 is formed as a unitary member having wall surfaces 26, 28 which are opposed from one another. Each of the wall surfaces is formed as a cylindrical portion with their cylindrical axes lying on planes which are generally perpendicular to one another. A passage such as a bore 30 provides communication from an opening on wall surface 26 to an opening on wall surface 28. Thus, it is possible to assemble a pair of tubes 32, 34 (provided with apertures 32a, 34a, respectively) in an assembly such as shown in FIG. 4. Coupling 24 provides a so-called T-fitting which permits fluid to pass from the interior of tube 32 into tube 34 in the direction of the arrows as shown. Suitable adhesive is applied to wall surfaces 26, 28 so that the tubes will be securably attached thereto.

It must be appreciated that coupling 24 provides an extremely simple T-fitting in that it is not necessary to provide threaded connections on any of the tubes or on the coupling itself in order to effect a T-fitting. It is only necessary to provide adhesive, align the apertures in the tubes with the bore in coupling 24, and assemble the parts together into the configuration as shown in FIG. 4.

Turning to still another embodiment of the present invention, attention is now directed to FIGS. 5 and 6. As shown in FIG. 5, a coupling 36 formed as a unitary member is shown positioned between a pair of tubes 38, 40 which include apertures 38a, 40a, respectively. Coupling 36 is also provided with a pair of opposed wall surfaces 42, 44 which are contoured with a periphery defining an inner surface of a portion of a cylinder. However, it is to be noted that the cylindrical axis of wall surface 44 is positioned at an angle relative to the cylindrical axis of wall surface 42. Stated another way, the wall surfaces are situated with their cylindrical axes being nonparallel. In fact, the present invention contemplates that the alignment of the cylindrical axes could be positioned at any angle which would be desired for a particular application.

Thus, in assembly, suitable adhesive is first applied to wall surfaces 42, 44 and tubes 38, 40, are positioned so that apertures 38a, 40a respectively are aligned with a bore 46 in the coupling. The bore provides a passage extending from an opening in wall surface 42 to an opening in wall surface 44. The final assembly is shown in FIG. 6 and is indicated generally at 48.

An application of the use of a coupling such as that indicated at 10 in FIGS. 1 and 2 is shown in further detail in FIG. 7. Specifically, FIG. 7 illustrates a tube bundle in which a plurality of tubes are interconnected for use, for instance, in a heat exchanger such as a solar collector. As may be seen, a pair of tubes 50, 52 are provided with suitable apertures which are aligned with the bore in coupling 10. The tubes are aligned with their cylindrical or longitudinal axes being generally parallel and they are suitably secured to the wall surfaces of coupling 10 by means of an adhesive. At an opposite or lower end, tube 52 is secured to tube 54 by another coupling 10 and tube 54 is, in turn, secured to a tube 56 by still another coupling 10. It can be appreciated that the ends of the tubes, with the exception of the inlet and outlet ends, are suitably capped so that fluid will be permitted to flow only through the apertures and the bores provided in the couplings. Further, it is to be appreciated that the spacing between the tubes is only limited by the thickness of the coupling and thus close packing of the tubes is readily achieved.

Another advantage of the configuration shown in FIG. 7 resides in the fact that the couplings, having wall expanses of a predetermined length formed as a portion of a right cylinder, provide support for the tubes. Thus, the couplings not only permit close packing of a tube bundle but also tend to provide structural integrity to the bundle. This is to be contrasted with the case of serpentine tubes which, in effect, are provided with no additional support adjacent the portions of the tubes which are bent to permit flow in a reverse direction.

Figure 8:
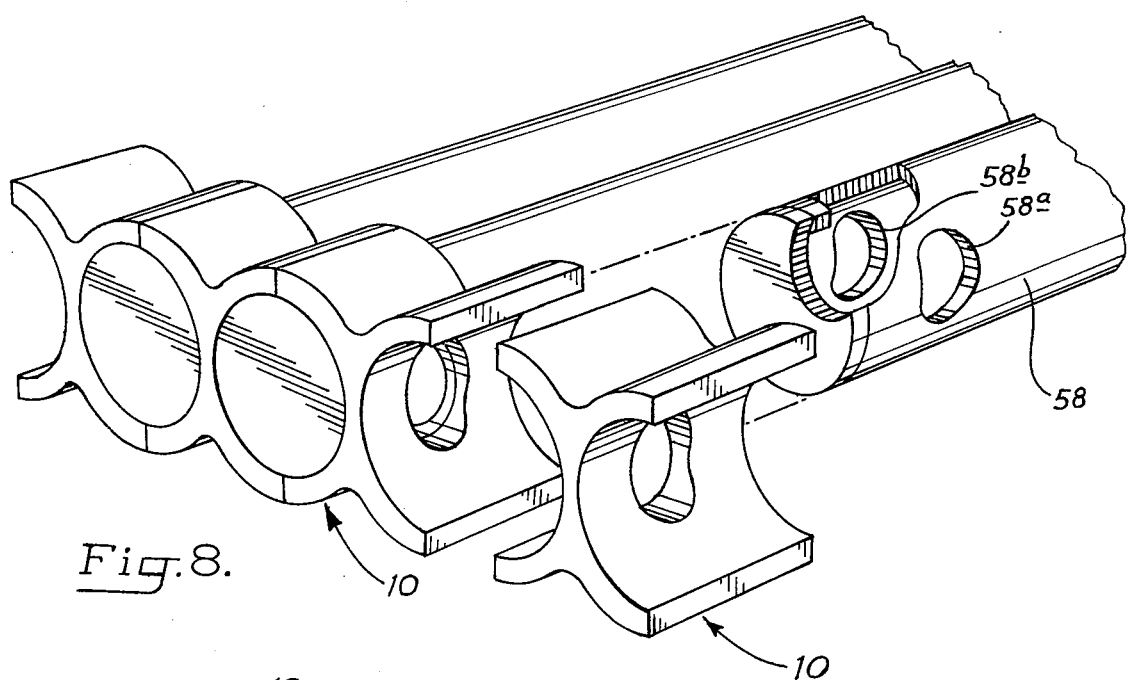
FIG. 8 is a perspective view illustrating positioning of conduits and couplings so that the couplings serve as a header.

Turning to still another embodiment of the present invention, attention is directed to FIG. 8 which discloses use of the coupling of the present invention as a header. Use as a header is achieved by stacking a continuous array of couplings, such as couplings indicated at 10, with the cylindrical axes of their respective bores substantially aligned. Positioned between each of the couplings is a tube such as the bundle of tubes illustrated in the figure. However, each of the tubes is provided with a pair of aligned apertures in its wall surface on opposite sides. Specifically, it can be seen that tube 58 is provided with apertures 58a, 58b which may be aligned with the bores in the two couplings shown to the right in FIG. 8. For instance, tube 58 is shown prior to its assembly, but it should be understood that after assembly, apertures 58a, 58b will be aligned with corresponding bores on opposed pairs of the couplings. Thus, it can be appreciated that fluid flow may be directed through an end coupling and continuously through an array of tubes. Specifically, fluid may be directed through the bore in coupling 10 in the right of the figure and will be distributed downwardly through tube 58 (when the tube is positioned in alignment) as well as being distributed to the other tubes through the apertures provided in them.

From a consideration of FIG. 8, it can be seen that by interconnecting a plurality of the couplings of the present invention, a header may be provided without any of the complications which are attendant in providing a conventional header. For instance, it is not necessary to provide any threaded fittings or to provide another conduit to serve as the header. Rather, it is only necessary to bore suitable apertures on opposite sides of each of the tubes and to position each of the apertures in alignment with bores in associated couplings. By providing adhesive on the couplings, the tubes may be readily secured thereto and a closely packed rigid construction results in which fluid is directed through the bores in the couplings into each of the tubes through the apertures provided in the tubes.

Figure 9:
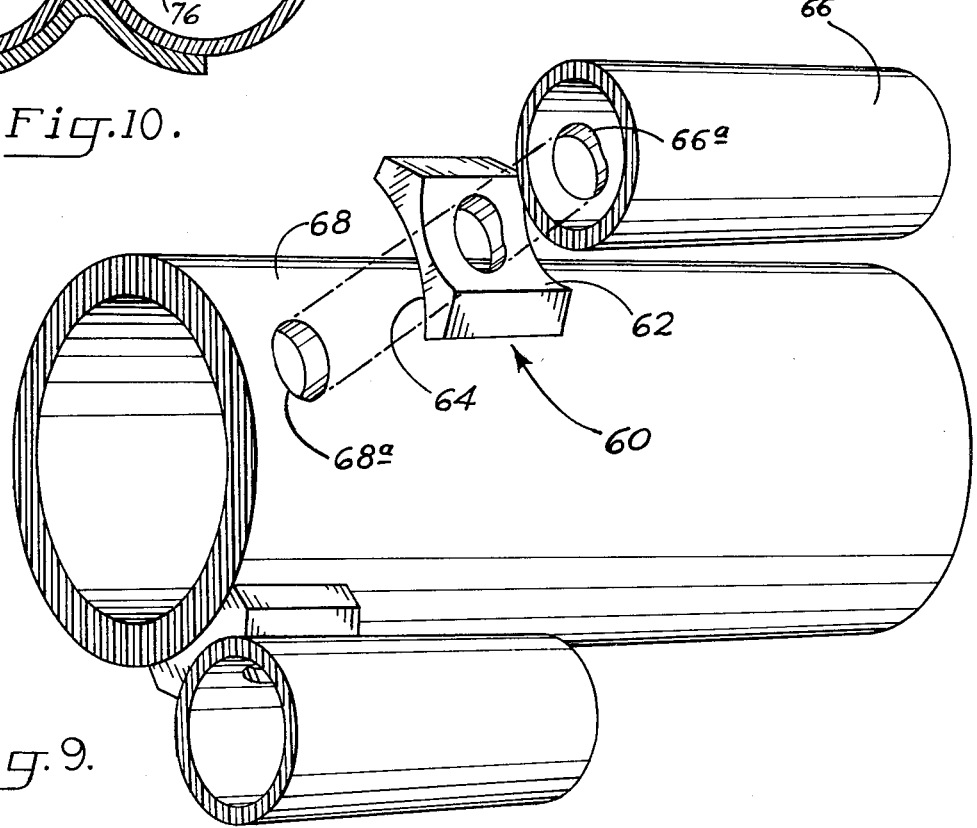
FIG. 9 is an exploded view, taken in perspective, illustrating the use of a coupling for positioning tubes of different diameters adjacent one another.

Still another use of the coupling in accordance with the present invention is illustrated in FIG. 9. As shown, a coupling generally indicated at 60 is provided with opposed wall surfaces 62, 64 which are dimensioned for accommodating tubes 66, 68, respectively. The tubes are dimensioned with different radii so that different cross-sectional peripheries are presented. However, when coupling 60 is positioned with its bore in alignment with apertures 66a, 68a provided on tubes 66, 68, respectively, it can be seen that a snug fit will result with close packing of the tubes. Thus, it can be appreciated that the coupling of the present invention may be formed as a unitary member in which the wall surfaces are dimensioned for receiving, in a snug fit, tubes having different cross-sectional outer peripheries or radii.

Figure 10:
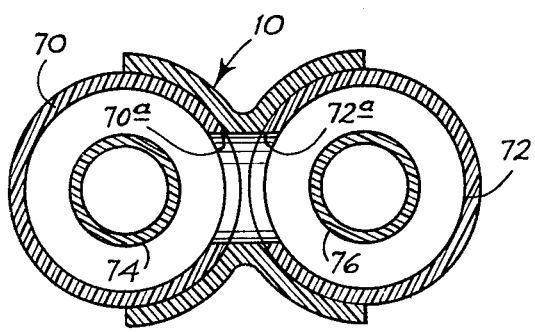
FIG. 10 is a front elevation view, taken in cross-section, of the coupling of the present invention used to interconnect a pair of conduits, each of the conduits containing a concentric inner conduit.

Lastly, it can be seen from a consideration of FIG. 10, a cross-sectional end elevation view, that coupling 10 may be used to permit fluid flow between a pair of tubes which include inner, concentrically mounted tubes. For instance, as illustrated, a pair of tubes 70, 72 are each provided with interiorally and concentrically mounted tubes 74, 76, respectively. Fluid flow in the annulus between the concentrically mounted tubes will be permitted to pass from one annulus to the other through the passage provided in the coupling. As with the embodiment set forth in FIGS. 1 and 2, tubes 70, 72 are provided with apertures 70a, 72a, respectively. The use of coupling 10 and tubes provided with inner, concentric tubes finds particular application in solar collecting apparatus. Generally it has been found that increased heat transfer will result if an innertube is used and the fluid to receive solar energy is distributed along the length of the tube only in the region of the aforementioned annulus.

To recap, it must be appreciated that the coupling and the assembly of the present invention provides several distinct and important advantages. Initially, it may be appreciated that close packing of tube bundles may be readily accomplished because complicated fittings are not required and the use of a serpentine construction is eliminated. It is only necessary to provide a suitable aperture in a tube and to position it adjacent the bore in the coupling. Another tube is positioned on the other wall surface of the coupling with its aperture in alignment with the bore. It can thus be seen that it is possible to readily interconnect tubes into a relatively rigid assembly without the use of threaded fittings, etc.

Furthermore, the present invention provides a coupling which may be formed as a T-fitting with tube accommodating surfaces positioned generally at right angles to one another. The tubes need only be adhered to the surfaces and the T-fitting results. Conventional T-fittings utilizing a threaded coupling are totally eliminated and savings in material as well as installation expenses are substantial. The T-fitting provided by the modified coupling of the present invention may find application in irrigation systems, plumbing for building, etc.

It must also be appreciated that manufacture of the coupling of the present invention may be accomplished either through machining or extrusion. Specifically, the embodiments of the coupling illustrated in FIGS. 1, 2 and 7-10 could readily be accomplished by extrusion. However, it is more than likely that the embodiments shown in FIGS. 3-6 would have to be manufactured by molding or machining.

While the invention has been particularly shown and described with reference to the foregoing preferred embodiments, it will be understood by those skilled in the art that other changes in form and detail may be made therein without departing from the spirit and scope of the invention as defined in the appended claims. For instance, while cylindrical tubes have been illustrated for use with the coupling of the present invention, other configurations could be readily used. The wall surfaces of the coupling would correspondingly be designed to accommodate a snug fit.

It is claimed and desired to secure by Letters Patent:

1. An assembly of interconnected conduits comprising:
   a first cylindrical conduit having an aperture extending through its wall thickness;
   a second cylindrical conduit disposed adjacent said first cylindrical conduit having an aperture extending through its wall thickness; and
   coupling means interconnecting said apertures formed as a unitary member having a first wall surface contoured as a cylindrical portion for mating with said first cylindrical conduit and a second, opposed wall surface also contoured as a cylindrical portion for mating with said second cylindrical conduit, said wall surfaces being separated by a thickness through which a substantially unobstructed passage extends, said passage being aligned with said apertures, said first and second conduits being separated by said wall thickness, means for sealing and securing said unitary member to said conduits and for permitting fluid flow through said passage between said first and second cylindrical conduits.

2. The assembly of claim 1 wherein said wall surfaces are aligned with their cylindrical axes generally parallel to each other.

3. The assembly of claim 1 wherein said wall surfaces are aligned with their cylindrical axes being nonparallel.

4. The assembly of claim 1 wherein said wall surfaces face away from each other.

5. The assembly of claim 1 wherein said first and second conduits are secured to their respective wall surfaces on said member by means of an adhesive.

6. The assembly of claim 1 wherein said first and second conduits are dimensioned with different cross-sectional outer peripheries.

7. The assembly of claim 1 wherein said passage is defined by a bore.

* * * * *